United States Patent
Lu et al.

(10) Patent No.: US 12,475,104 B2
(45) Date of Patent: Nov. 18, 2025

(54) DATA PROCESSING METHOD, DISTRIBUTED DATABASE SYSTEM, ELECTRONIC DEVICE AND STORAGE MEDIUM

(71) Applicant: HANGZHOU ALICLOUD FEITIAN INFORMATION TECHNOLOGY CO., LTD., Hangzhou (CN)

(72) Inventors: Biao Lu, Hangzhou (CN); Yanfeng Lin, Hangzhou (CN); Xueqiang Wu, Hangzhou (CN); Youyou Deng, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,170

(22) PCT Filed: Oct. 11, 2022

(86) PCT No.: PCT/CN2022/124621
§ 371 (c)(1),
(2) Date: Feb. 20, 2024

(87) PCT Pub. No.: WO2023/066086
PCT Pub. Date: Apr. 27, 2023

(65) Prior Publication Data
US 2024/0346010 A1   Oct. 17, 2024

(30) Foreign Application Priority Data
Oct. 18, 2021   (CN) .......................... 202111207876.X

(51) Int. Cl.
G06F 16/23 (2019.01)
G06F 16/27 (2019.01)

(52) U.S. Cl.
CPC .......... *G06F 16/2365* (2019.01); *G06F 16/27* (2019.01)

(58) Field of Classification Search
CPC .... G06F 16/2365; G06F 16/27; G06F 16/219; G06F 16/2322
See application file for complete search history.

(56) References Cited

U.S. PATENT DOCUMENTS

| | | | |
|---|---|---|---|
| 2004/0031030 A1* | 2/2004 | Kidder | H04L 41/22 717/172 |
| 2018/0293280 A1* | 10/2018 | Svec | G06F 16/289 |

(Continued)

FOREIGN PATENT DOCUMENTS

CN   113656384 A   11/2021

OTHER PUBLICATIONS

International Search Report for PCT/CN2022/124621, mailed Jan. 18, 2023, 2 pages.

*Primary Examiner* — Aleksandr Kerzhner
*Assistant Examiner* — Aryan D Toughiry
(74) *Attorney, Agent, or Firm* — Armstrong Teasdale LLP

(57) ABSTRACT

Embodiments of the present application provide a data processing method, a distributed database system, an electronic device and a computer storage medium, wherein a data processing method is applied to a shard node of a distributed database system. The method comprises: receiving a physical DDL instruction converted from a logic DDL instruction for change of data in the distributed database system; executing the physical DDL instruction and generating a shard node mode snapshot for the shard node after the physical DDL instruction has been successfully executed; and if it is determined that the shard node mode snapshot is inconsistent with a global logic mode snapshot of the distributed database system, adjusting log data of the (Continued)

shard node aggregated into a global log to be consistent with the global logic mode snapshot.

20 Claims, 7 Drawing Sheets

(56) References Cited

U.S. PATENT DOCUMENTS

2018/0322156 A1* 11/2018 Lee .................. G06F 16/23
2022/0197892 A1* 6/2022 Freedman ........... G06F 16/27

* cited by examiner

S200 receiving physical DDL instruction converted from logic DDL instruction for change of data in distributed database system — S202 executing physical DDL instruction and generating shard node mode snapshot for this shard node after physical DDL instruction has been successfully executed — S204 if it is determined that shard node mode snapshot is inconsistent with global logic mode snapshot of distributed database system, adjusting log data of this shard node aggregated into global log to be consistent with global logic mode snapshot — S206

FIG. 3A

| Shard 1 Physical Schema snapshot version history || Shard 2 Physical Schema snapshot version history || Shard 3 Physical Schema snapshot version history || Logic Schema snapshot version history ||
|---|---|---|---|---|---|---|---|
| Time | Version | Time | Version | Time | Version | Time | Version |
| 0 | V1 | 0 | V1 | 0 | V1 | 0 | V1 |
| 100 | V2 | 200 | V2 | 300 | V2 | 500 | V2 |
| 600 | V3 | 700 | V3 | 800 | V3 | 900 | V3 |
| ... | ... | ... | ... | ... | ... | ... | ... |

FIG. 3B

Electronic device 700

DATA PROCESSING METHOD, DISTRIBUTED DATABASE SYSTEM, ELECTRONIC DEVICE AND STORAGE MEDIUM

The present application is the 35 U.S.C. § 371 U.S. National Phase of International Patent Application No. PCT/CN2022/12461, filed Oct. 11, 2022, which claims priority to Chinese patent application No. 202111207876.X entitled "DATA PROCESSING METHOD, DISTRIBUTED DATABASE SYSTEM, ELECTRONIC DEVICE AND STORAGE MEDIUM", filed with the China National Intellectual Property Administration on Oct. 18, 2021, the disclosures of which are incorporated in the present application by reference in their entirety.

TECHNICAL FIELD

Embodiments of the present application relate to the field of computer technology, and more specifically, to a data processing method, a distributed database system, an electronic device and a computer readable medium.

BACKGROUND

Distributed database refers to a cluster of databases which are distributed over computer networks and logically interrelated to each other. With the constant development of database technology, an increasing number of distributed databases adopt the sharding form. In such form, data storage units in the distributed database are divided into fragments and the division of the global database is known as sharding.

In distributed data of sharding form, e.g., MYSQL-SHARDING type distributed database, this type of distributed data implements global Binlog on the basis of TSO, to ensure transaction integrity and total order at data replication. TSO (Timestamp Oracle) is a centralized timestamp generator that provides totally ordered timestamp services. For the sake of description, TSO may refer to timestamps generated by the timestamp generator in the following text. Global Binlog (binary log files) is a logic Binlog, which contains physical Binlog of all DN nodes (Data Node, data storage node) to ensure transaction integrity and inter-transaction total order based on commit TSO sequence of Binlog Event.

However, during change of DDL (Data Definition Language, e.g., statements concerted with addition of column, change of column type and length and increase of constraints etc.), Schema (mode) change of different shards could not be fully synchronized due to the distribution features. In other words, there are two versions of Schema metadata of the database at the same moment. For example, in terms of the operation of adding a column, the new column may have already been visible to some shards while remains invisible to the rest. As shown in FIG. 1, during the period where two versions of Schema metadata are present, if the DML (Data Manipulation Language, operation instructions, such as INSERT, UPDATE and DELETE) operation is executed, two versions of Binlog Events would be generated correspondingly in the respective Binlogs corresponding to the shard. As shown in FIG. 1, two versions of data, i.e., V1 and V2, are present during TSO100-TSO200 and TSO200-TSO300. For example, in the most common scenario where a data replication link is constructed by consuming the global Binlog, if no additional processing is made, a series of issues may be caused when the two versions of Binlog Events are transmitted to a downstream system (such as standalone MySQL) through the global Binlog Stream. For example, data replication abnormality, data truncation and precision loss may occur as the data content recorded in the transmitted Binlog Event does not match with the Schema of the downstream system.

At present, a solution to the above issues includes: disabling write of the DML operation while the DDL change is executed, to avoid multiple versions of data: then selecting a given physical DDL Event as a representative and outputting it downstream. However, write is disabled for DML in the above solution, which may cause data service interruption. Moreover, the solution is less achievable.

SUMMARY

Embodiments of the present application provide a data processing solution to at least partly address the above problems.

In a first aspect of the embodiments of the present application, there is provided a data processing method, applied to a shard node of a distributed database system. The method includes: receiving a physical DDL instruction converted from a logic DDL instruction for change of data in the distributed database system: executing the physical DDL instruction and generating a shard node mode snapshot for this shard node after the physical DDL instruction has been successfully executed; and if it is determined that the shard node mode snapshot is inconsistent with a global logic mode snapshot of the distributed database system, adjusting log data of this shard node aggregated into a global log to be consistent with the global logic mode snapshot.

In a second aspect of the embodiments of the present application, there is provided a further data processing method, applied to a middleware node of a distributed database system. The method includes: receiving a logic DDL instruction for change of data in the distributed database system and converting the logic DDL instruction into a physical DDL instruction; and issuing the physical DDL instruction to a corresponding shard node to allow the shard node to execute the physical DDL instruction; and after successful execution of the physical DDL instruction, adjusting log data of this shard node aggregated into a global log based on a consistency relation between a shard node mode snapshot generated for this shard node and a global logic mode snapshot obtained, such that the log data of the shard node aggregated into the global log is consistent with the global logic mode snapshot.

In a third aspect of the embodiments of the present application, there is provided a distributed database system, including a middleware node and a shard node, wherein: the middleware node is used for receiving a logic DDL instruction for change of data in the distributed database system, converting the logic DDL instruction into a physical DDL instruction and issuing the physical DDL instruction to the corresponding shard node; and the shard node is provided for executing the physical DDL instruction and generating a shard node mode snapshot for the shard node after successful execution of the physical DDL instruction; if it is determined that the shard node mode snapshot is inconsistent with a global logic mode snapshot of the distributed database system, log data of the shard node aggregated into the global log is adjusted to be consistent with the global logic mode snapshot.

In a fourth aspect of the embodiments of the present application, there is provided an electronic device, including: a processor, a memory, a communication interface and a communication bus, the processor, the memory and the communication interface communicating with one another through the communication bus: wherein the memory is provided for storing at least one executable instruction, and the executable instruction enables the processor to perform operations corresponding to the data processing method according to the first aspect or the second aspect.

In a fifth aspect of the embodiments of the present application, there is provided a computer storage medium stored with computer programs thereon, wherein the computer programs, when executed by a processor, implement the method according to the first aspect or the second aspect.

In a sixth aspect of the embodiments of the present application, there is provided a computer program product including computer instructions, wherein the computer instructions instruct a computing device to perform operations corresponding to the first aspect or the second aspect.

The data processing solution provided by embodiments of the present application introduces the Schema snapshot, i.e., mode snapshot. The mode snapshot is divided into two categories, respectively being shard node mode snapshot and global logic mode snapshot. After the respective shard nodes have successfully executed the physical DDL instruction, a shard node mode snapshot is generated for this shard node and compared with the global logic mode snapshot. In case of inconsistency of the shard node mode snapshot and the global logic mode snapshot, the log data of the shard node aggregated to the global log is adjusted to be consistent with the global logic mode snapshot. The reason for the above issue is that the operation of executing the physical DDL instruction by the respective shard nodes lacks atomicity. Therefore, until all shard nodes have successfully executed the physical DDL instruction, the log data in different mode versions will be generated and input to the global log in real time. By adjusting the log data of the shard node aggregated to the global log to be consistent with the global logic mode, the original global logic mode is still the baseline when some of the shard nodes have not completed the DDL operation, until a new global logic mode snap shot is generated after each shard node has completed the DDL operation. For example, in data replication scenarios based on global log, it is ensured that data in consistent versions are output downstream. Therefore, there is no need to disable DML write or lock the DML, which may further affect the normal data service. Besides, the background data synchronization process is transparent to users, which effectively solves the problem of data processing anomalies caused by multiple data versions during the DDL change of the distributed database system.

BRIEF DESCRIPTION OF THE DRAWINGS

To more clearly explain the technical solutions of the embodiments of the present application or in the related art, drawings to be used in the description of the embodiments or the related art are simply introduced. The drawings described below are merely some of the embodiments of the present application. For those ordinary skilled in the art, other drawings may also be obtained based on the drawings below:

FIG. 3A illustrates a flowchart of steps of a data processing method in accordance with Embodiment I of the present disclosure:

FIG. 3B illustrates a schematic diagram of mode snapshot in the distributed database system of Embodiment I shown in FIG. 3A:

DETAILED DESCRIPTION OF EMBODIMENTS

Figure 2:
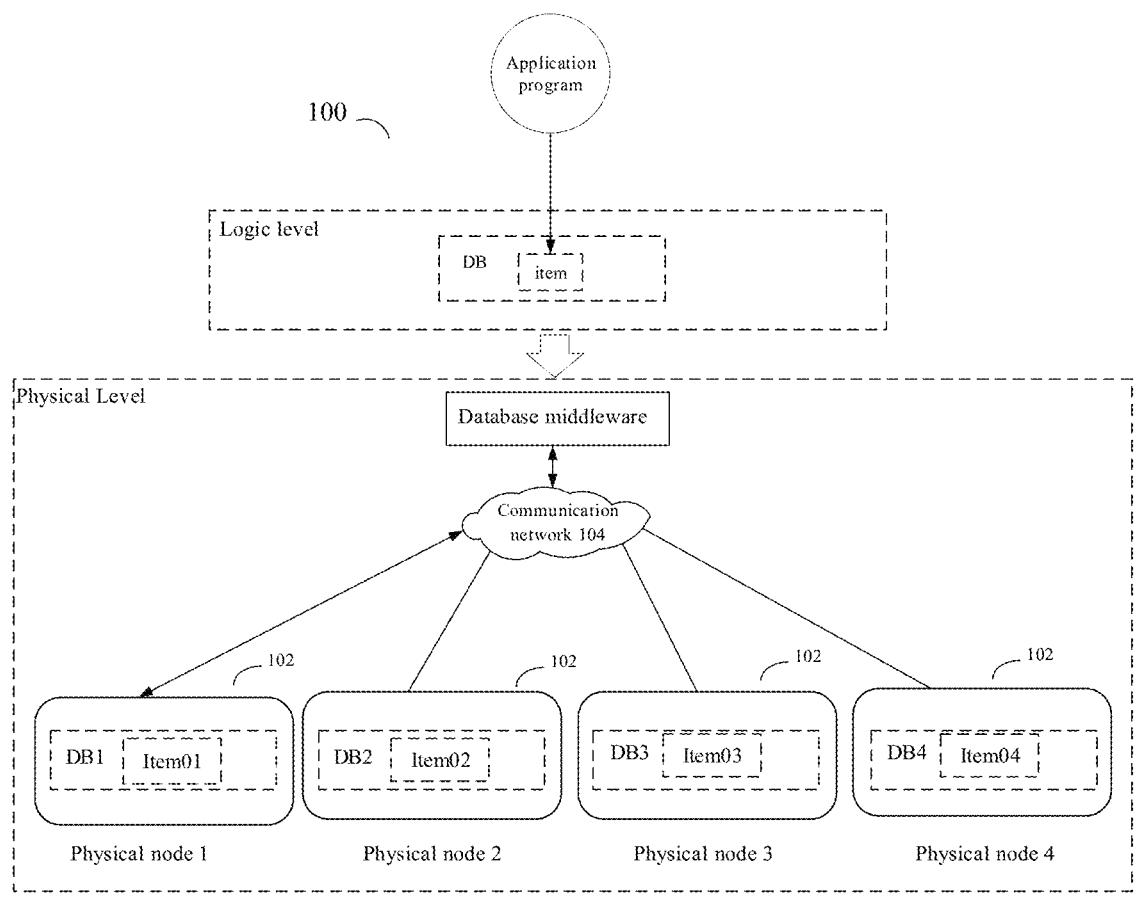
FIG. 2 illustrates a structural diagram of a distributed database system in accordance with an exemplary embodiment of the present disclosure.

To enable those skilled in the art to better understand the technical solutions in the embodiments of the present application, technical solutions in the embodiments of the present application are to be clearly and fully depicted below with reference to the drawings in the embodiments of the present application. Apparently, the embodiments described here are only part of the embodiments of the present application, rather than all of them. Based on the depicted embodiments, those ordinary skilled in the art may obtain all of the other embodiments, which belong to the protection scope defined by the embodiments of the present application. FIG. 2 illustrates a distributed system. This system 100 may include a plurality of physical nodes 102 connected via a communication network 104. FIG. 2 shows four physical nodes as an example.

In the distributed database system, physical nodes 102 are mainly used for storing information, data, programs and/or any other types of contents, managed and operated by DBMS (Database Management System). One or more database shards may be deployed on one physical node. In the embodiments of the present application, each database shard is referred to as one shard node.

A distributed database is a uniform entity at logic level, but is separately stored on different physical nodes at physical level. In the distributed database system, one application may perform transparent operations on the database, whereas the data in the database are separately stored in different local databases, managed by various DBMS, running on distinct machines, supported by different operating systems and connected through various communication networks. From the perspective of users, the distributed database system is identical to an integrated database system logically, and the user may execute a global application at any site, as if the data are stored on the same computer and managed by a single DBMS.

For a distributed database system in form of shards, it is required to perform sharding on the database. In such case, one data table may be split into a plurality of databases to form a plurality of tables. According to the example in FIG. 2, item table originally is one table, which is split into four tables (respectively being item01, item02, item03 and item04) distributed to four databases (DB1, DB2, DB3 and DB4) based on a certain principle (for example, based on itemid). Besides, in the example of FIG. 2, the four databases are respectively located on four distinct physical nodes 1, 2, 3 and 4 (part of the data may be located on the same physical node in practical application). In such case, the application could not be directly connected to the database, and instead is routed by a middleware supporting database sharding to access data. In the MYSQL-SHARDING distributed database, a computing node CN therein may act as the middleware (also known as middleware node).

On this basis, as shown in FIG. 2, the access to database as for the users, on logic level, is still in the form of single base and single table, such as logic base DB and logic table item in FIG. 2. In practice, access to item by the application is routed to databases and data tables on different physical nodes via the middleware. For example, assuming itemid0001-1000 is in the table item01, itemid1001-2000 is in the table item02, itemid2001-3000 is in the table item03, and itemid3001-4000 is in the table item04, the access to itemid1501 by the user is routed to item02 of DB02 on the physical node 2 by the middleware.

In some embodiments, when users input a logic DDL instruction for a logic base table, the middleware nodes first receive the externally input logic DDL instruction and then judge a compatibility type of the logic DDL instruction, so as to determine whether to make a new logic Schema externally visible immediately. Afterwards, the middleware nodes convert the logic DDL instruction into a physical DDL instruction and distributes the physical DDL instruction to all shard nodes: each shard node executes the physical DDL instruction and records a DDL Event in its physical log: the middleware nodes wait until all shard nodes have successfully executed the physical DDL instruction to construct a DDL marking instruction; the middleware nodes distribute the DDL marking instruction to all shard nodes: each shard node executes the DDL marking instruction and generates in their respective physical logs a DDL marking event indicating the marking operation: the middleware nodes wait until all shard nodes have successfully executed the marking operation: at this time, the middleware nodes also may depend on a previous judgment result concerned with compatibility of the logic DDL instruction: if it is determined that the judgment result indicates making the new logic Schema externally visible at this phase, a corresponding operation is performed to make the new logic Schema externally visible.

In some embodiments, the communication network 104 may be any suitable combinations of one or more wired and/or wireless networks. For example, the communication network 104 can include one of more of: Internet, Intranet, Wide Area Network (WAN), Local Area Network (LAN), wireless network, Digital Subscriber Line (DSL) network, frame relay network, Asynchronous Transfer Mode (ATM) network, Virtual Private Network (VPN) and/or any other suitable communication networks.

On the basis of the above system, embodiments of the present application provide a data processing method, which is further explained through the following multiple embodiments.

Embodiment I

FIG. 3A illustrates a flowchart of steps of a data processing method in accordance with Embodiment I of the present application.

The data processing method 200 of this embodiment is explained from the perspective of shard nodes in the distributed database system. The data processing method 200 includes steps S202 to S206.

At S202, a physical DDL instruction converted from a logic DDL instruction for change of data in the distributed database system is received.

As stated above, although the data in the distributed database system may be actually distributed over a plurality of physical nodes or a plurality of shard nodes, it is the "single-base and single-table" form that is present to the users. The users may directly perform corresponding operations on the respective "single table" (i.e., the logic table displayed to the users), such as the operation of DDL change on the data table etc. This DDL operation on the logic table would generate a logic DDL instruction.

The logic DDL instruction may fulfill the following functions, including adding data column to the data table, changing the type and the length of the data column and increasing constraints over the data column etc. However, it is required to finally convert the logic DDL instruction into an instruction that can be executed by the database and the data table corresponding to the actual shard nodes, i.e., physical DDL instruction, to fulfill its objective.

In some embodiments, for the distributed MySQL-SHARDING database system, the base table having a plurality of shards is the logic base table and the DDL instruction acting on the logic base table is the logic DDL instruction: the data of each shard should be stored to its respective sharding, i.e., physical base table (specifically implemented on corresponding shard nodes), and the DDL instruction functioning on the physical base table is the physical DDL instruction.

Wherein the specific approach for converting the logic DDL instruction into the physical DDL instruction may be implemented by those skilled in the art in suitable manners depending on the actual situations. Embodiments of the present application are not restricted in this regard as long as the converted physical DDL instruction can be accurately issued to corresponding shard nodes.

Moreover, it should be noted that quantifiers in plural form, such as "a plurality of" and "various kinds", throughout the embodiments of the present application refer to two or more than two unless indicated otherwise.

The method then goes to step S204. At step S204, the physical DDL instruction is executed and a shard node mode snapshot is generated for this shard node after the physical DDL instruction has been successfully executed.

This embodiment is explained by an example of executing the DDL instruction with an individual shard node. However, those skilled in the art should know that all shard nodes involved in the logic DDL instruction may perform the data processing method 200 with reference to this embodiment in actual applications.

Each shard node in the distributed database system will immediately execute the physical DDL instruction once receiving it. In the embodiments of the present application, after successfully executing the physical DDL instruction, each shard node will generate in its log corresponding event data, e.g., DDL Event (the DDL event and DDL Event may be considered as different expressions of the same meaning in the embodiments of the present application unless specified otherwise). Based on the event data, the corresponding nodes (including but not limited to computing nodes, management nodes, this shard node and a physical node where it is located) in the distributed database also would generate a shard node mode snapshot for this shard node, i.e., Schema snapshot of this shard node.

Mode Schema, also known as data mode, is a description of logic structure and features of all data in the database. It only relates to "type" description without stating specific values. "Type" illustrates structure and attribute of a given type of data, while value assigns a specific number to the type. A specific value of the mode is denoted as an instance and the same mode may have many instances. As such, the mode reflects data structure and associations, whereas the instance reveals a state of the database at a given moment. For the distributed database, a global logic database/table displayed at user level has a corresponding global logic Scheme. However, the database and table on the specific shard nodes have corresponding local Schema, i.e., Schema of this shard node. As to the distributed database system in sharding fashion, e.g., distributed MySQL-SHARDING database system, a base table having a plurality of shards is a logic base table, and the Schema of the logic base table is logic Schema: the data of each shard should be stored to respective sharding. i.e., physical base table (specifically implemented on corresponding shard nodes); the Schema of the physical base table is physical Schema.

The DDL instruction mostly relates to changes of data table structure and attributes of data columns therein. Therefore, in the embodiments of the present application, after a certain shard node successfully executes the physical DDL instruction, a Schema snapshot will be generated for this shard node to provide basis for subsequent comparison with the global logic Schema.

Next, the method proceeds to step S206. At step S206, if it is determined that the shard node mode snapshot is inconsistent with the global logic mode snapshot of the distributed database system, log data of this shard node aggregated into a global log is adjusted to be consistent with the global logic mode snapshot.

Continuing with the aforementioned MYSQL-SHARDING type distributed database as an example. Binlog (physical Binlog and logic Binlog) fully documents various operations of the database in sequence with Events. For example, DDL type operations and DML type operations respectively correspond to DDL Event and DML Event in the Binlog file (it may be assumed in the embodiments of the present application that DML Event and DML event are different expressions of the same meaning unless indicated otherwise). Each DDL Event represents one change of the mode Schema, i.e., each DDL Event corresponds to a mode snapshot version. Event in Binlog should satisfy the following two constraints: first, the DDL Event must have atomicity, i.e., one DDL operation should only correspond to one DDL Event in the Binlog and shall not be split into two or more: secondly, the data mode of each DML Event must be consistent with the mode snapshot corresponding to the latest DDL Event. The two constraints should be met simultaneously to ensure that no abnormalities occur during consumption of data in Binlog.

On this basis, in the embodiment of the present application, for one DDL instruction, the global logic mode in general is a mode after the DDL instruction has been successfully completed by all shard nodes. Thus, in case that a logic DDL instruction is converted into a physical DDL instruction and issued to the shard nodes, the global logic mode of the distributed database system is still the mode after the execution of the previous DDL instruction if the logic DDL instruction is not completely by every shard node. For example, when the DDL instruction A is successfully executed at 23:00 of Jan. 1, 2021, the global logic mode corresponding to the distributed database system is a mode at 23:00 of Jan. 1, 2021 and the snapshot generated at this moment is global logic mode snapshot A. Then, when the logic DDL instruction B is triggered at 22:00 of Jan. 3, 2021 and a plurality of physical DDL instructions is generated and issued to corresponding multiple shard nodes, the global logic mode corresponding to the distributed database system at 22:00 of Jan. 3, 2021 is still the mode at 23:00 of Jan. 1, 2021 and the corresponding global logic mode snapshot is also snapshot A. Assuming that the DDL instruction B is successfully executed at 23:00 of Jan. 3, 2021, the corresponding global logic mode of the distributed database system is the mode at 23:00 of Jan. 3, 2021, and the generated snapshot is a global logic mode snapshot B. However, the global logic mode between 22:00 of Jan. 3, 2021 and 23:00 of Jan. 3, 2021 is still snapshot A. In other words, a new global logic mode snapshot is generated only when all shard nodes have successfully completed the DDL instruction.

Comparison between Schema snapshot of a plurality of shard nodes and global logic Schema snapshot is shown in FIG. 3B. As shown, an update of the global logic Schema snapshot is later than an update of the shard node Schema snapshot.

On this basis, in case that only a part of the shard nodes in the distributed database system has successfully executed the physical DDL instruction, the shard nodes that successfully execute the physical DDL instruction would have a shard node mode snapshot inconsistent with the global logic mode snapshot of the distributed database system. In another aspect, the log data of the shard nodes will keep aggregating into the global log. In such case, it is required to adjust the log data of the shard nodes aggregated into the global log, such that the log data in the shard node is consistent with the global logic mode snapshot, wherein the global log generally contains logs of all shard nodes, such as global Binlog, i.e., global log, where the Binlog containing all DN nodes ensures transaction integrity and inter-transaction total order based on commit TSO sequence of the Binlog Event.

For example, it is assumed that the shard node 1, after successfully executing the physical DDL instruction, records the execution information of the physical DDL instruction and the post-execution data, simply denoted as A. It is further assumed that the data of the current global logic mode snapshot is simply indicated as B, it is required to extract A from the log, adjust A to be consistent with B and then input the adjusted A into the global log.

Figure 1:
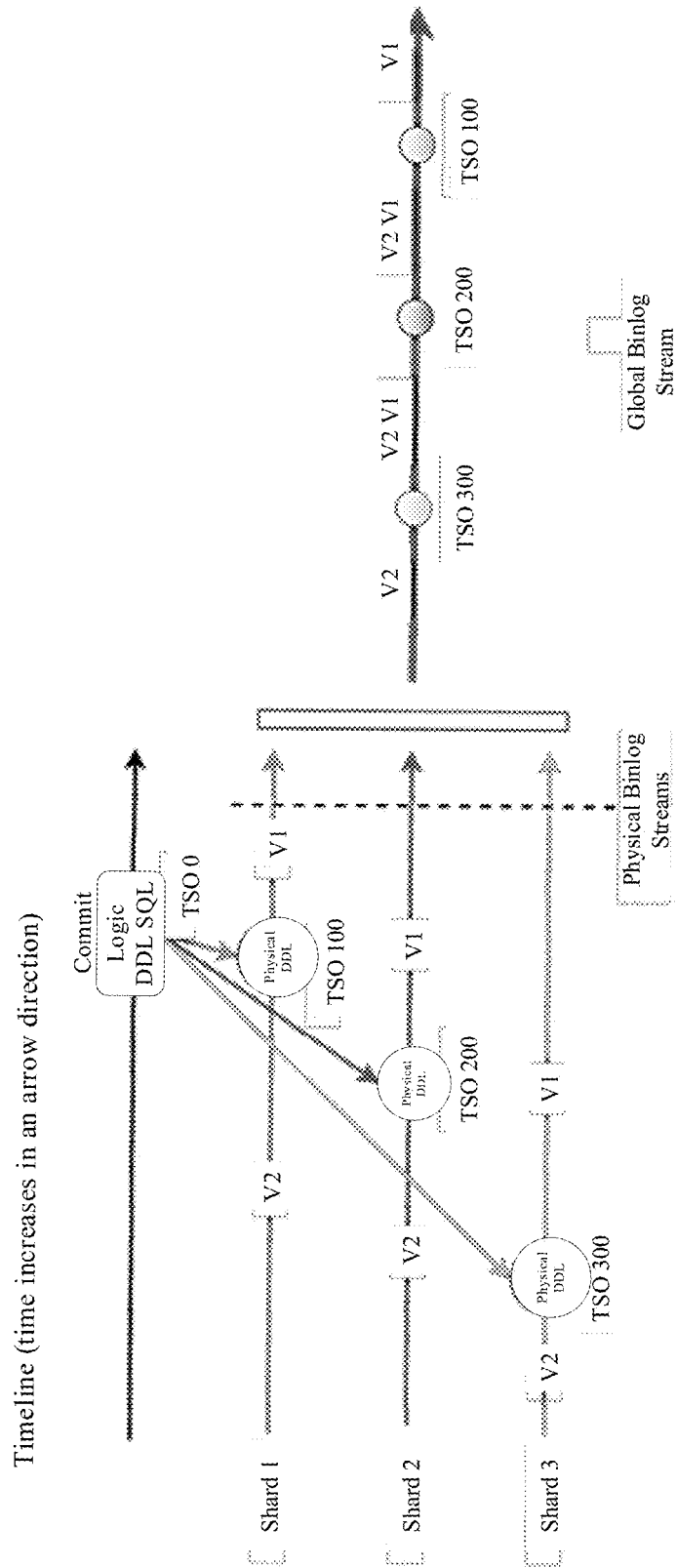
FIG. 1 illustrates a schematic diagram of a procedure for executing DDL instructions in a distributed database system in accordance with an exemplary embodiment of the present disclosure.

The reason for this is that the update of the global logic mode snapshot depends on the global log, while the update of the global log relies on the log data of the shard nodes that are pulled and input in real time. A simple example is provided below: As shown in FIG. 1, it is assumed that the distributed database system includes four physical nodes 1, 2, 3 and 4 and only one shard is deployed on each physical node. To facilitate the description, the shards deployed on the four physical nodes are respectively known as shard node 1, 2, 3 and 4. Besides, the shard nodes 1, 2, 3 and 4 all correspond to Schema A1 for the time being, and the global Schema corresponding to the distributed database system is also A1. It is configured that the logic DDL instruction X indicating an addition of one column to the respective data tables is triggered and converted into four physical DDL instructions X1, X2, X3 and X4 corresponding to the shard nodes 1, 2, 3 and 4. As such, when the shard node 1 successfully executes X1, its schema is updated to A2 and an update of its physical log is triggered simultaneously, where the execution information of X1 and the post-execution data information are recorded in the physical log. Once the physical log is aggregated to the global log, it will cause an update of the global log on the basis of the data information after the execution of X1 in the physical log. Since the shard nodes 2, 3 and 4 have not completed the execution of X2, X3 and X4, their corresponding Schema is still A1, which may induce inconsistency in data processing and access. However, in accordance with the solution of the embodiment of the present application, when the shard node 1 has successfully executed X1, its Schema is updated to A2 and an update of its physical log is triggered. However, in case that the shard nodes 2, 3 and 4 have not completed the execution of the corresponding X2. X3 and X4, the log data of the shard node 1 aggregated to the global log would be adjusted for consistency with the global Schema snapshot, i.e., snapshot corresponding to A1. At this time, although the database table in the shard node 1 has already changed, the input of data in A2 version into the global log induced by the Schema change of the shard node 1 would not occur thanks to the adjustment of the log data. As a result, data processing abnormalities resulted from outputting inconsistent data to a downstream system that consumes the global log when part of the shard nodes has not completed the DDL instruction may be avoided.

The global log fully documents various operations of the database in sequence with Events. For example, DDL type operations and DML type operations respectively correspond to DDL Event and DML Event in the log file. Each DDL Event represents one change of the global logic mode, i.e., each DDL Event corresponds to a global logic mode snapshot version. The global log must satisfy the following constrains: the data mode of each DML Event should be consistent with the global logic mode snapshot corresponding to the latest DDL Event: otherwise, data processing abnormalities may occur when the global log is consumed in sequence. However, in case that the DDL operations of a plurality of shard nodes are not synchronous, the DML Event of the plurality of shard nodes aggregated to the global log may have multiple versions, violating the previous two constraints. However, the log data of the shard nodes aggregated to the global log is adjusted to be consistent with the global logic mode, i.e., the global logic mode is the baseline. When some of the shard nodes have not completed the DDL operation, the DML Event is adjusted based on the original global logic mode until a new global logic mode snapshot is generated after all shard nodes have completed the DDL operation, so as to continue meeting the above two constraints. Therefore, there is no need to disable DML write or lock the DML, which may further affect the normal data service. Besides, the background data synchronization process is transparent to users, and the operations of the users on the global data table would not cause data processing anomalies, which effectively solves the problem of data processing anomalies caused by multiple data versions during the DDL change of the distributed database system.

This embodiment introduces the Schema snapshot, i.e., mode snapshot. The mode snapshot is divided into two categories, respectively being shard node mode snapshot and global logic mode snapshot. After the respective shard nodes have successfully executed the physical DDL instruction, a shard node mode snapshot is generated for this shard node and compared with the global logic mode snapshot. In case of inconsistency of the shard node mode snapshot and the global logic mode snapshot, the log data of the shard node aggregated to the global log is adjusted to be consistent with the global logic mode snapshot. The reason for the above issue is that the operation of executing the physical DDL instruction by the respective shard nodes lacks atomicity. Therefore, until all shard nodes have successfully executed the physical DDL instruction, the log data in different mode versions will be generated and input to the global log in real time. By adjusting the log data of the shard node aggregated to the global log to be consistent with the global logic mode, the original global logic mode is still the baseline when some of the shard nodes have not completed the DDL operation, until a new global logic mode snap shot is generated after each shard node has completed the DDL operation. For example, in data replication scenarios based on global log, it is ensured that data in consistent versions are output downstream. Therefore, there is no need to disable DML write or lock the DML, which may further affect the normal data service. Besides, the background data synchronization process is transparent to users, which effectively solves the problem of data processing anomalies caused by multiple data versions during the DDL change of the distributed database system.

Embodiment II

Figure 4A:
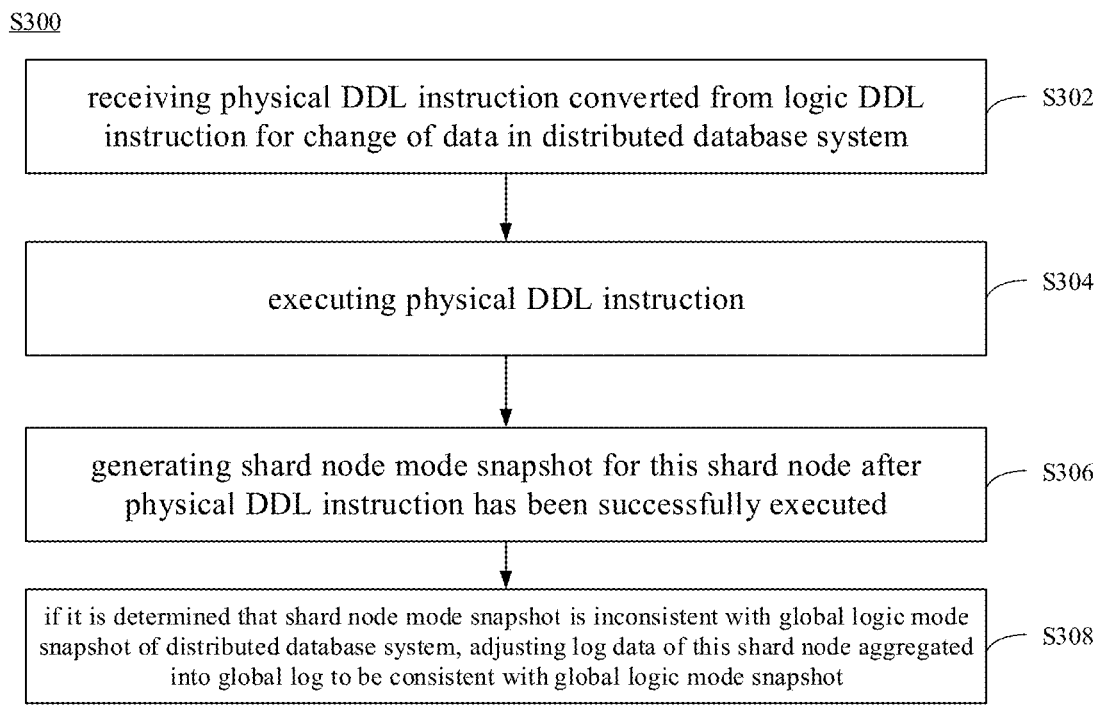
FIG. 4A illustrates a flowchart of steps of a data processing method in accordance with Embodiment II of the present disclosure.

FIG. 4A illustrates a flowchart of steps of a data processing method in accordance with Embodiment II of the present application.

The data processing method 300 of this embodiment is still elaborated from the perspective of shard nodes in the distributed database system. The data processing method 300 includes following steps:

At Step 302, a physical DDL instruction converted from a logic DDL instruction for change of data in the distributed database system is received.

In some embodiments, for the distributed MySQL-SHARDING database system, the DDL instruction acting on the logic base table is the logic DDL instruction, and the DDL instruction functioning on the physical base table is the physical DDL instruction. The logic DDL instruction may fulfill the following functions, including adding data column to the data table, changing the type and the length of the data column and increasing constraints over the data column etc. However, the specific approach for converting the logic DDL instruction into the physical DDL instruction may be implemented by those skilled in the art in suitable manners depending on the actual situations. Embodiments of the present application are not restricted in this regard as long as the converted physical DDL instruction can be accurately issued to corresponding shard nodes.

Next, the method proceeds to step S304. At step 304, the physical DDL instruction is executed.

As stated above, the DDL instruction may fulfill the following functions, including adding data column to the data table, changing the type and the length of the data column and increasing constraints over the data column etc. The respective shard nodes, once receiving their own physical DDL instructions, may perform, in accordance with the instructions, the operation indicated by the instructions on the database of this shard node.

The method then goes to step S306. At step S306, a shard node mode snapshot is generated for this shard after the physical DDL instruction is successfully executed.

When a certain shard node successfully executes the physical DDL instruction, its Schema may change; and a snapshot may be generated for the Schema of this shard node, for future comparison with the global Schema snapshot.

In a feasible way, this step may be implemented as: after the physical DDL instruction has been successfully executed, generating, in the log data of this shard node, a DDL event indicating that the physical DDL instruction has been successfully executed by this shard node, so as to generate a shard node mode snapshot for a shard node that has successfully executed the physical DDL instruction based on the DDL event. As the log data may sequentially reflect the changes of the node, a mode snapshot is generated for this shard node based on the DDL events in the log data. Thus, atomicity and consistency of the generation process are protected without introducing a lock mechanism.

Besides, in this embodiment, after all shard nodes have successfully executed respective physical DDL instructions, a corresponding DDL marking event inserted into the log data of this shard node for indicating successful completion of the logic DDL instruction is received, wherein the DDL marking event has information about TSO of the distributed database system and the DDL marking event of this shard node has the same TSO as DDL marking event of other shard nodes. The solution is explained from the angle of a single shard node in this embodiment. However, from the perspective of the distributed database system, after all shard nodes have successfully executed their respective physical DDL instructions, a DDL marking event is inserted to the logs of every shard node at the same TSO time, to indicate the successful execution of the logic DDL instruction.

In other words, the DDL marking event for a shard node refers to inserting the same data into the physical log of the shard node, to indicate successful execution of the logic DDL instruction. In this way, the adjustment as to whether the physical DDL instructions of the respective shard nodes are successfully executed nor not may be executed more efficiently. In addition, the distributed event has the same Commit TSO in each shard node, which may effectively ensure consistency of DDL related data processing in each physical log.

In a feasible way, the inserting into the log data of this shard node a corresponding DDL marking event for indicating successful completion of the logic DDL instruction may be implemented as: inserting into the log data of this shard node event data for indicating that the logic DDL instruction has been successfully executed, the event data containing content data of the logic DDL instruction.

Both the above DDL marking event and the TSO information would play a role in the future update of the global log, to provide basis for the update of the global logic Schema.

The method then proceeds to step S308. At step S308, if it is determined that the shard node mode snapshot is inconsistent with a global logic mode snapshot of the distributed database system, log data of this shard node aggregated into a global log is adjusted to be consistent with the global logic mode snapshot.

For one DDL instruction, the global logic mode snapshot usually triggers the generation of the mode snapshot after the DDL instruction has been successfully executed by all shard nodes. As such, in the case that a logic DDL instruction is converted into a physical DDL instruction, which is further issued to the shard nodes, the global logic mode snapshot of the distributed database system is still the mode snapshot after the execution of the previous DDL instruction if some of the shard nodes have not completed the execution. The generation of a new global logic mode snapshot is triggered only after all shards node have successfully completed the DDL instruction.

In case that only a part of the shard nodes in the distributed database system has successfully executed the physical DDL instruction, the shard nodes that successfully execute the DDL instruction would have a shard node mode snapshot inconsistent with the global logic mode snapshot of the distributed database system. In such case, it is required to adjust the log data of the shard nodes coming into the global log to be consistent with the global logic mode snapshot. As a result, data access and processing abnormalities induced by differences between the log data and the global Schema when part of the shard nodes has not completed the DDL instruction may be avoided. The specific implementation may refer to the related description in the above Embodiment I and will not be repeated here.

Figure 4B:
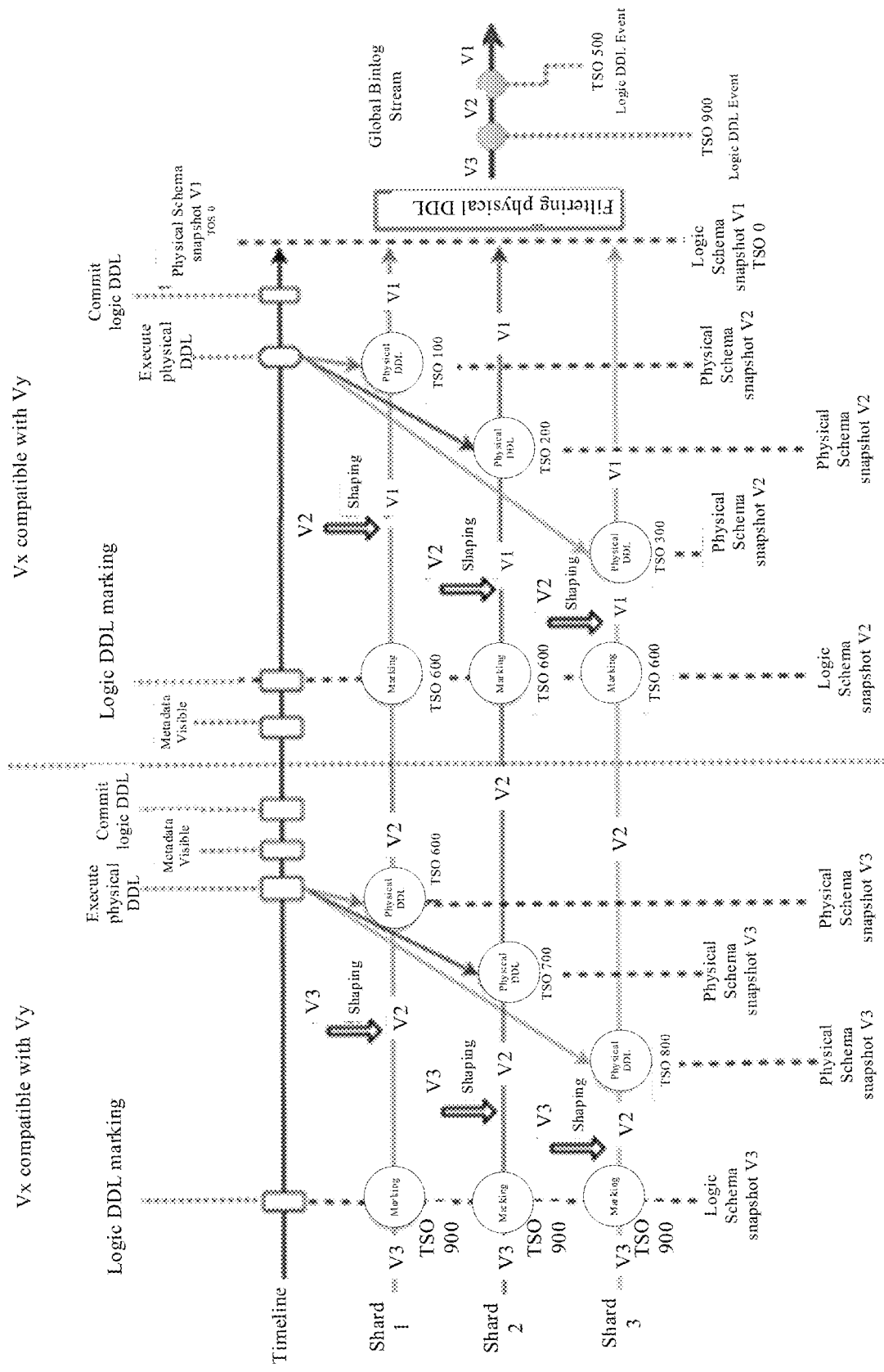
FIG. 4B illustrates a schematic diagram of a process of data processing according to the embodiment shown in FIG. 3A.

The data processing procedure of the distributed database system in the above way is illustrated in FIG. 4B. As shown, after the respective shard nodes have successfully completed the physical DDL instruction and the DDL marking is performed in the physical log, the global log will generate a uniform logic DDL event based on the DDL marking event, so as to protect data consistency on respective TSO time points.

Accordingly, this embodiment introduces the Schema snapshot. i.e., mode snapshot. The mode snapshot is divided into two categories, respectively being shard node mode snapshot and global logic mode snapshot. After the respective shard nodes have successfully executed the physical DDL instruction, a shard node mode snapshot is generated for this shard node and compared with the global logic mode snapshot. In case of inconsistency of the shard node mode snapshot and the global logic mode snapshot, the log data of the shard node aggregated to the global log is adjusted to be consistent with the global logic mode snapshot. The reason for the above issue is that the operation of executing the physical DDL instruction by the respective shard nodes lacks atomicity. Therefore, until all shard nodes have successfully executed the physical DDL instruction, the log data in different mode versions will be generated and input to the global log in real time. By adjusting the log data of the shard node aggregated to the global log to be consistent with the global logic mode, the original global logic mode is still the baseline when some of the shard nodes have not completed the DDL operation, until a new global logic mode snap shot is generated after each shard node has completed the DDL operation. For example, in data replication scenarios based on global log, it is ensured that data in consistent versions are output downstream. Therefore, there is no need to disable DML write or lock the DML, which may further affect the normal data service. Besides, the background data synchronization process is transparent to users, which effectively solves the problem of data processing anomalies caused by multiple data versions during the DDL change of the distributed database system.

Embodiment III

Figure 5:
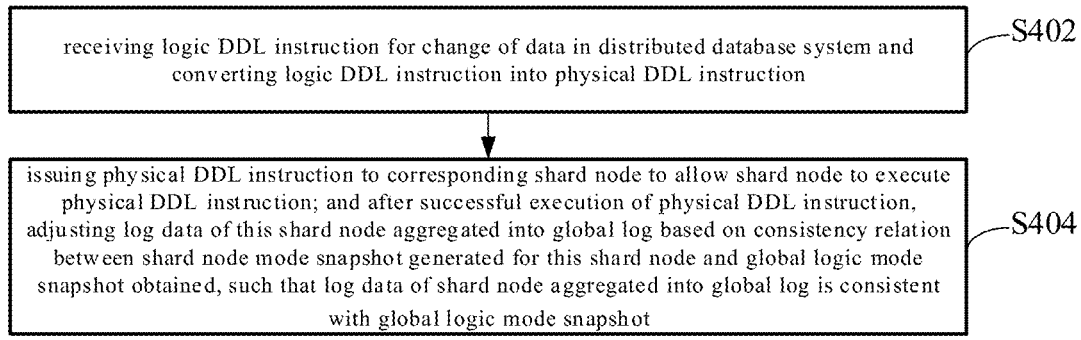
FIG. 5 illustrates a flowchart of steps of a data processing method in accordance with Embodiment III of the present disclosure.

FIG. 5 illustrates a flowchart of steps of a data processing method in accordance with Embodiment III of the present application.

The data processing method 400 of this embodiment is elaborated from the perspective of middleware nodes in the distributed database system. The data processing method 400 includes following steps:

At step S402, a logic DDL instruction for change of data in the distributed database system is received and converted into a physical DDL instruction.

As stated above, based on the displayed global logic table, users issue the DDL instruction, i.e., logic DDL instruction, which should be converted into physical DDL instruction executable by shard nodes in practice.

The method next proceeds to step S404. At step S404, the physical DDL instruction is issued to a corresponding shard node to allow the shard node to execute the physical DDL instruction; and after successful execution of the physical DDL instruction, log data of this shard node aggregated into a global log is adjusted based on a consistency relation between a shard node mode snapshot generated for this shard node and a global logic mode snapshot obtained, such that log data of the shard node aggregated into the global log is consistent with the global logic mode snapshot.

By sending the physical DDL instruction to the corresponding shard nodes, the shard nodes can receive the instructions and further execute them correctly. The global logic mode snapshot may be stored in any appropriate nodes or storage space as long as it can be obtained when needed. On the basis of the consistency relation between the mode snapshot of the shard node and the global logic mode snapshot, the log data of the shard node aggregated to the global log is adjusted to avoid data processing abnormalities resulted from outputting inconsistent data to a downstream system that consumes the global log when part of the shard nodes has not completed the DDL instruction.

This embodiment introduces the Schema snapshot, i.e., mode snapshot, such that a mode snapshot is generated for this shard node after the respective shard nodes have successfully executed the physical DDL instruction. The mode snapshot is compared with the global logic mode snapshot. In case of inconsistency of the mode snapshot and the global logic mode snapshot, the log data of the shard node aggregated to the global log is adjusted. By adjusting the log data of the shard node aggregated to the global log to be consistent with the global logic mode, the original global logic mode is still the baseline when some of the shard nodes have not completed the DDL operation while the shard nodes still continue the DDL operation in the background in practice, until a new global logic mode snap shot is generated after each shard node has completed the DDL operation. Therefore, there is no need to disable DML write or lock the DML, which may further affect the normal data service. Besides, the background data synchronization process is transparent to users, which effectively solves the problem of data processing anomalies caused by multiple data versions during the DDL change of the distributed database system.

Embodiment IV

Figure 6:
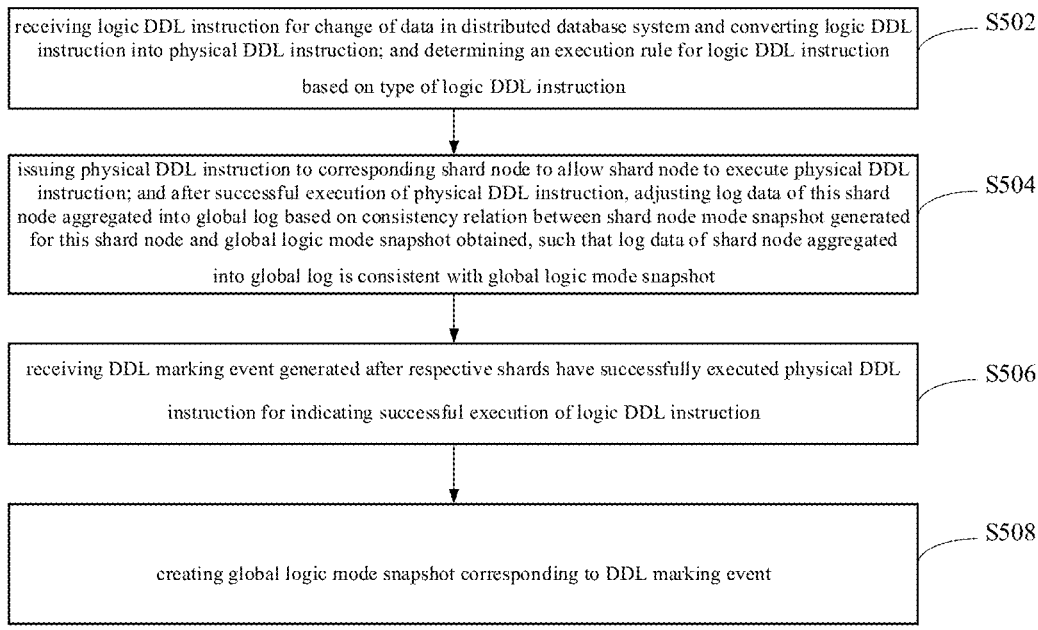
FIG. 6 illustrates a flowchart of steps of a data processing method in accordance with Embodiment IV of the present disclosure.

FIG. 6 illustrates a flowchart of steps of a data processing method in accordance with Embodiment IV of the present application.

The data processing method 500 of this embodiment is still elaborated from the perspective of middleware nodes in the distributed database system. The data processing method 500 includes following steps.

At step S502, a logic DDL instruction for change of data in the distributed database system is received and converted into a physical DDL instruction; and an execution rule is determined for the logic DDL instruction based on a type of the logic DDL instruction.

In this embodiment, after the logic DDL instruction acting on the global logic table is received, it is converted into the physical DDL instruction executed by the respective shard nodes. Moreover, an execution rule is also determined for the logic DDL instruction based on the type of the logic DDL instruction.

In this embodiment, the logic DDL instruction is divided, in accordance with the induced change of the Schema version, into two types, including new mode compatible with old mode type and old mode compatible with new mode type.

For example, the Schema structure at a given moment (including table structure and the like) is known as a mode version: the mode version before the execution of the logic DDL instruction is referred to as Vx; and the mode version after the execution of the logic DDL is denoted as Vy. In such case, the compatibility between the mode versions corresponding to the logic DDL instruction is as follows: one mode version Va is compatible with Vb in case that: (1) a set of Elements (e.g., column and index etc.) contained in Va is a superset of the Element set included in Vb; and (2) the same Element has a greater length or precision in Va than in Vb.

On this basis, the logic DDL instruction is divided into following types:
(1) the logic DDL type where Vy is compatible with Vx (i.e., new mode compatible with old mode type): the operations indicated by such logic DDL instruction may include at least one of:
(A) addition of data column:
(B) increase of data column length, e.g., varchar (128) →varchar (1024);
(C) increase of default value of data column:
(D) creation and deletion of index:
(E) creation and deletion of data constraints, such as creating unique key constraint:
(F) creation of new data table:
(G) increase of data column precision, such as double (10)→double (20).
(2) The DDL type where Vx is compatible with Vy (i.e., old mode compatible with new mode type); the operations indicated by such logic DDL instruction may include at least one of:
(H) deletion of data column:
(I) decrease of data column length, e.g., varchar (1024) →varchar (128);
(J) deletion of data table:
(K) decrease of data column precision, such as double (20)→double (10).

According to the above setting, in a feasible way, this step may be implemented as: determining an execution rule for the logic DDL instruction based on a type of the logic DDL instruction.

In one embodiment, if the logic DDL instruction is of the type where new mode is compatible with old mode, an execution rule of the logic DDL instruction is determined as: issuing the physical DDL instruction to the shard node: generating the DDL marking event for indicating successful execution of the logic DDL instruction after all shard nodes have successfully executed the physical DDL instruction; and setting the new mode to be externally visible after the DDL marking event. In this way, the logic DDL instruction, being a new mode compatible with old mode type, is more concerned with addition of data column and creation of data table etc. As such, the new mode is made externally visible after the DDL marking event, to avoid data service abnormality or interruption in case that operations for the newly added data columns or newly created data tables by the users are received while some of the shard nodes have not completed the physical DDL instruction yet. Accordingly, the smooth execution of the DDL instruction is ensured.

In a further embodiment, if the logic DDL instruction is of a type where old mode is compatible with new mode, an execution rule of the logic DDL instruction is determined as: setting the new mode to be externally visible: then issuing the physical DDL instruction to a shard node; and generating a DDL marking event for indicating successful execution of logic DDL instruction after all shard nodes have successfully executed the physical DDL instruction. In this way, the logic DDL instruction, being an old mode compatible with new mode type, is more concerned with deletion of data column, deletion of data table and the like. As such, the new mode is first made externally visible, to avoid data service abnormality or interruption in case that operations for the deleted data columns or data tables in the original mode by the users are still received while some of the shard nodes have already completed the physical DDL instruction. Accordingly, the smooth execution of the DDL instruction is ensured.

When different execution rules are determined for various types, it may ensure smooth execution of the DDL instruction and also effectively avoid data service interruption or abnormality issues resulted from data processing on the logic base table by the users.

Next, the method proceeds to step S504. At step S504: the physical DDL instruction is issued to a corresponding shard node to allow the shard node to execute the physical DDL instruction; and after successful execution of the physical DDL instruction, log data of this shard node aggregated into a global log is adjusted based on a consistency relation between a shard node mode snapshot generated for this shard node and a global logic mode snapshot obtained, such that log data of the shard node aggregated into the global log is consistent with the global logic mode snapshot.

As stated above, if the logic DDL instruction is a new mode compatible with old mode type, the logic DDL instruction is converted into the physical DDL instruction, which physical DDL instruction is issued to the corresponding shard nodes, to enable the shard nodes to perform corresponding operations. However, if the logic DDL instruction is an old mode compatible with new mode type, the new mode is first made externally visible, to allow the user to operate based on the new mode. Afterwards, the physical DDL instruction is issued to the corresponding shard nodes to execute corresponding operations.

However, during the generation process of the global log, the log data of the shard node would be pulled and aggregated in real time. As such, if the shard node mode snapshot is inconsistent with the obtained global logic mode snapshot, it is required to adjust the log data of this shard node input to the global log to be consistent with the global logic mode snapshot.

The method then goes to step S506. At step S506, a DDL marking event generated after respective shards have successfully executed the physical DDL instruction for indicating successful execution of a logic DDL instruction is received.

After the respective shard nodes in the distributed database system have successfully executed the physical DDL instruction, a DDL marking event will be inserted into their physical logs, where the DDL marking event usually contains details of the logic DDL instruction and may be fed back via the physical log and used by the global log.

In addition, the DDL marking event usually has TSO information of the distributed database system, indicating time point corresponding to the DDL marking event. The DDL marking events of the respective shard nodes have the same TSO.

The method subsequently proceeds to step S508, at which a global logic mode snapshot corresponding to the DDL marking event is created.

In a feasible way, DDL marking events corresponding to respective shard nodes may be merged based on information of the TSO corresponding to DDL marking events in log data of respective shard nodes; and a logic DDL event is generated in a global log in view of a merging result.

For example, the DDL marking event has the same commit TSO in each shard to ensure consistency of DDL processing in each physical Binlog queue. The DDL marking event will be merged in the global Binlog (e.g., randomly choosing one from physical DDL marking events that describes the same DDL marking event and abandoning the rest) and converted into a logic DDL Event indicating successful execution of the logic DDL instruction. The data before and after the DDL Event correspond to different Schema versions.

Every time a logic DDL event is received in the global Binlog, a new snapshot of the global Schema is added for use by the next DDL operation.

This embodiment introduces the Schema snapshot, i.e., mode snapshot, such that a mode snapshot is generated for this shard node after the respective shard nodes have successfully executed the physical DDL instruction. The mode snapshot is compared with the global logic mode snapshot. In case of inconsistency of the mode snapshot and the global logic mode snapshot, the log data of the shard node aggregated to the global log is adjusted. By adjusting the log data of the shard node aggregated to the global log to be consistent with the global logic mode, the original global logic mode is still the baseline when some of the shard nodes have not completed the DDL operation while the shard nodes still continue the DDL operation in the background in practice, until a new global logic mode snap shot is generated after each shard node has completed the DDL operation. Therefore, there is no need to disable DML write or lock the DML, which may further affect the normal data service. Besides, the background data synchronization process is transparent to users and the operations on the global data table by the users would not lead data processing abnormalities, which effectively solves the problem of data processing anomalies caused by multiple data versions during the DDL change of the distributed database system.

Embodiment V

Referring again to the distributed database system shown in FIG. 2, this embodiment will explain the distributed database involved in the embodiments of the present disclosure with a specific example with reference to the previous description in the above method embodiments.

According to FIG. 2, the distributed database system includes middleware nodes and physical nodes, and one or more shard nodes may be provided on each physical node.

Therefore, it also may be considered that the distributed database system includes middleware nodes and shard nodes.

The middleware node is used for receiving a logic DDL instruction for change of data in a distributed database system, converting the logic DDL instruction into a physical DDL instruction and issuing the physical DDL instruction to a corresponding shard node. The shard node is provided for executing the physical DDL instruction and generating a shard node mode snapshot for this shard node after successful execution of the physical DDL instruction: if it is determined that the shard node mode snapshot is inconsistent with a global logic mode snapshot of the distributed database system, log data of this shard node aggregated into the global log is adjusted to be consistent with the global logic mode snapshot.

In some embodiments, the middleware nodes are also provided for inserting into the log data of the shard nodes a corresponding DDL marking event indicating successful execution of the logic DDL instruction: generating a logic DDL event based on the DDL marking event in the log data of the respective shard nodes; and creating a global logic mode snapshot corresponding to the logic DDL event.

The MYSQL-SHARDING distributed database, as an example, will globally maintain a snapshot history in the global logic Schema version, receive a logic DDL event in the global Binlog (logic Binlog containing all DN nodes ensures transaction integrity and inter-transaction total order based on commit TSO sequence of the Binlog Event) queue, and add a logic Schema snapshot version.

Each shard self-maintains the snapshot history in physical Schema version. Every time a DDL event is received in the physical Binlog (Binlog on each MYSQL node under the distributed MYSQL-SHARDING scenarios: e.g., Binlog on each DN node) queue, a physical Schema snapshot version is added.

After the physical DDL instruction is successfully executed, the physical Schema and global logic Schema version corresponding to a DML event generated from the DML operation may be obtained through querying the Schema snapshot history based on the time of the DML event. In case of inconsistency between the versions, it is required to shape the DML event and the data contents of this DML event are adjusted to a state consistent with the logic Schema snapshot. For example, in the scenario of addition of data columns, the physical Schema snapshot will have one more column than the global logic Schema snapshot. As such, this column of data in the DML event should be cut. However, in the scenario of deletion of data column, the global logic Schema snapshot will have one more column than the physical Schema snapshot, which requires adding a data column to the DML event.

After the physical DDL instruction has been successfully executed, the same event data will be inserted to the Binlog corresponding to each shard. The event data contains the contents of the logic DDL SQL (i.e., logic DDL instruction), and this operation is defined as DDL marking event. The marking event has the same commit TSO in each shard to ensure consistency of the DDL processing in each physical Binlog queue. The DDL marking event will be merged in the global Binlog and then converted into a logic DDL event indicating successful execution of the logic DDL instruction. The data before and after the logic DDL event correspond to various Schema versions.

Moreover, in a specific execution process, the middleware nodes would employ different execution rules for various types of the logic DDL instructions. For example, if the logic DDL instruction is of a type where Vy version is compatible with Vx version, the processing is performed in following sequence: first executing the physical DDL instruction, then marking the logic DDL and then making the Vy version externally visible. However, if the logic DDL instruction is of a type where Vx version is compatible with Vy version, the processing is performed in following sequence: first making the Vy version externally visible, then performing the physical DDL instruction and marking the logic DDL in the end.

The distributed database system of this embodiment introduces the Schema version snapshot and shapes different versions of physical Binlog data based on the Schema snapshot history: Without disabling write or adding a lock, this embodiment solves the issue about the multiple data versions resulted from the DDL change process under the distributed database scenarios. In addition, it makes use of the feature that distributed event has the same Commit TSO in each shard, logical DDL events are constructed by DDL marking events, the problem of inconsistency among physical DDL of individual shards is solved, and consistent DDL replication capability is provided.

Embodiment VI

Figure 7:
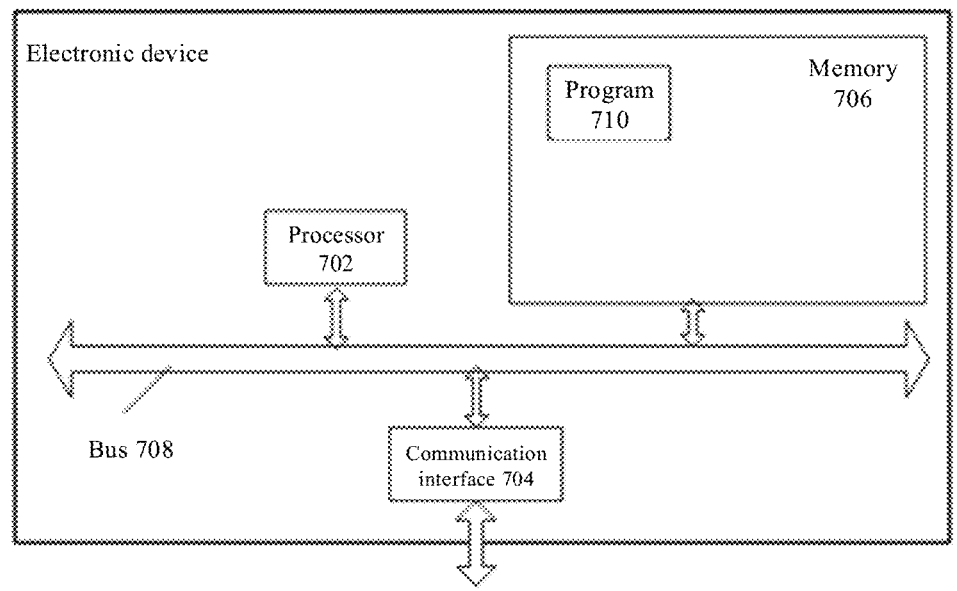
FIG. 7 illustrates a structural diagram of an electronic device in accordance with Embodiment VI of the present disclosure.

FIG. 7 illustrates a structural diagram of an electronic device in accordance with Embodiment VI of the present application. The detailed embodiments of the present application do not restrict the specific implementations of the electronic device.

As shown in FIG. 7, the electronic device 700 may include: a processor 702, a communication interface 704, a memory 706 and a communication bus 708.

The processor 702, the communication interface 704 and the memory 706 communicate with one another through the communication bus 708.

The communication interface 704 is provided for communicating with other electronic devices in the distributed database system.

The processor 702 is used for executing a program 710, specifically related steps in the above data processing method embodiment.

In an embodiment, the program 710 may include program codes, which program codes contain computer operation instructions.

The processor 702 may be a processor CPU or ASIC (Application Specific Integrated Circuit), or configured as one or more integrated circuits for implementing embodiments of the present application. Smart device includes one or more processors, e.g., processors of the same type, such as one or more CPU: or processors of different types, such as one or more CPU and one or more ASIC.

The memory 706 is provided for storing the program 710. The memory 706 may include a cache RAM, as well as non-volatile memory, e.g., at least one disk storage.

The program 710 is specifically used for enabling the processor 702 to execute the data processing method according to any one of the above method embodiments.

Specific implementations of various steps in the program 710 may refer to description of corresponding steps and units in the above data processing method embodiments, and will not be repeated here. Those skilled in the art may clearly understand that for the sake of convenience and simplicity of description, the detailed working procedures of the device and modules described above will not be repeated here. Instead, reference may be drawn from the corresponding process description in the above method embodiments and corresponding advantageous effects will also be obtained.

Embodiments of the present application also provide a computer program product including computer instructions, which causes the computing device to perform operations corresponding to any one data processing method in the above multiple method embodiments.

The data processing solution provided in the embodiments of this application may be widely applied in different situations to support various applications. For example, for large-scale enterprise level applications or Internet system applications, in order to cope with high traffic, high concurrency, and massive data storage scenarios, distributed data storage solutions are usually introduced, such as introducing sharding middleware or directly deploying distributed NewSQL databases. At the same time, these enterprises usually build their own DataPipelines to achieve data distribution and subscription and support various types of business scenarios, such as real-time synchronization of data from OLTP databases to the search engine ElasticSearch. In the era emphasizing agile development and rapid iteration, it is a common phenomenon to perform high-frequency DDL operations on base tables. At the same time, it is a rigid demand to achieve automatic replication of DDL in Pipeline (such as addition of new data columns to MySQL. Pipeline may automatically synchronize with ElasticSearch to add new data columns). However, after the introduction of distributed data storage solutions, many distributed NewSQL databases in the industry do not have the capability to externally output consistent DDL events so far as the DDL operations on different storage nodes cannot achieve atomicity. In such case. DDL subscription capabilities may be sacrificed or the DDL of each storage node may be externally output, which induce data version inconsistency. However, the solution according to the embodiments of the present application can effectively avoid the above issues, so as to provide data service support for various Internet applications or enterprise-level applications.

It is to be pointed out that various components/steps described in the embodiments of the present application may be split into more components/steps according to the implementation requirements. Alternatively, two or more components/steps or part thereof may be combined into new components/steps to fulfill the objective of the embodiments of the present application.

The above method according to embodiments of the present application may be implemented in hardware and firmware, or may be implemented as software or computer codes to be stored in a record medium (such as CD ROM, RAM, floppy disk, hard disk or magneto-optical disk), or may be implemented computer codes downloaded via networks, originally stored in a remote recording medium or a non-transitory machine-readable medium and to be stored in a local recording medium. As such, the method described here may be stored on a recording medium using a general-purpose computer, dedicated processor, or programmable or dedicated hardware (such as ASIC or FPGA) for software processing. It can be understood that computer, processor, microprocessor controller, or programmable hardware includes storage assembly (such as RAM. ROM and flash memory, etc.) that can store or receive software or computer codes. When the software or computer code is accessed and executed by the computer, processor, or hardware, the data processing method described here is implemented. Furthermore, when the general-purpose computer accesses the codes used to implement the data processing method illustrated here, the execution of the code converts the general-purpose computer into a dedicated computer used to execute the data processing method shown herein.

Those skilled in the art may realize that the units and method steps of each example described according to the disclosed embodiments can be implemented in electronic hardware, or a combination of computer software and electronic hardware. It depends on the specific application and design constraints of the technical solution to determine whether these functions are executed in hardware or software. Professionals may use different methods to achieve the described functions for each specific application, but such implementation should not be considered beyond the scope of the embodiments of the present application.

The above implementations are only used to illustrate the embodiments of the present application, rather than restricting them. Those skilled in the art also may make various changes and variations without deviating from the spirit and scope of the embodiments of the present application. Therefore, all equivalent technical solutions also belong to the scope of the embodiments of the present application. The patent protection scope of the embodiments of the present application should be limited by the claims.

For example, in data replication scenarios based on global log, it is ensured that data in consistent versions are output downstream. Therefore, there is no need to disable DML write or lock the DML, which may further affect the normal data service. Besides, the background data synchronization process is transparent to users, which effectively solves the problem of data processing anomalies caused by multiple data versions during the DDL change of the distributed database system.

What is claimed is:

1. A data processing method, applied to a shard node of a distributed database system, comprising:

receiving a physical DDL instruction converted from a logic DDL instruction for change of data in the distributed database system;

executing the physical DDL instruction and generating a shard node mode snapshot for the shard node after the physical DDL instruction has been successfully executed, wherein the shard node mode snapshot corresponding to a shard node mode that is changed after the shard node has successfully executed the physical DDL instruction, wherein for each shard node, a shard node mode snapshot is generated for the shard node after the shard node has successfully executed the physical DDL instruction, and wherein the shard node mode snapshot describes logic structure and features of data stored in the corresponding shard node after the shard node has successfully executed the physical DDL instruction;

comparing the shard node mode snapshot with a global logic mode snapshot of the distributed database system, wherein the global logic mode snapshot corresponding to a global logic mode that is changed after all shard nodes in the database system have successfully executed the physical DDL instruction, wherein the global logic mode snapshot describes logic structure and features of all data stored in the all shard nodes in the database system; and determining that the shard node mode snapshot is inconsistent with the global logic mode snapshot, adjusting log data of the shard node aggregated into a global log to be consistent with the global logic mode snapshot.

2. The method of claim 1, wherein the generating the shard node mode snapshot for the shard node after the physical DDL instruction has been successfully executed, comprises:

after the physical DDL instruction has been successfully executed, generating, in the log data of the shard node, a DDL event indicating that the physical DDL instruction has been successfully executed by the shard node, so as to generate the shard node mode snapshot for the shard node that has successfully executed the physical DDL instruction based on the DDL event.

3. The method of claim 2, further comprising:
inserting a corresponding DDL marking event into the log data of the shard node for indicating successful completion of the logic DDL instruction after all shard nodes have successfully executed respective physical DDL instructions, and receiving the corresponding DDL marking event, wherein the DDL marking event has information of TSO of the distributed database system and the DDL marking event of the shard node has the same TSO as DDL marking event of other shard node.

4. The method of claim 3, wherein the inserting the corresponding DDL marking event into the log data of the shard node for indicating successful completion of the logic DDL instruction, comprises:
inserting event data into the log data of the shard node for indicating that the logic DDL instruction has been successfully executed, the event data containing content data of the logic DDL instruction.

5. The method of claim 1, further comprising:
inserting a corresponding DDL marking event into the log data of the shard node for indicating successful completion of the logic DDL instruction after all shard nodes have successfully executed respective physical DDL instructions, and receiving the corresponding DDL marking event, wherein the DDL marking event has information of TSO of the distributed database system and the DDL marking event of the shard node has the same TSO as DDL marking event of other shard node.

6. The method of claim 5, wherein the inserting the corresponding DDL marking event into the log data of the shard node for indicating successful completion of the logic DDL instruction, comprises:
inserting event data into the log data of the shard node for indicating that the logic DDL instruction has been successfully executed, the event data containing content data of the logic DDL instruction.

7. An electronic device, comprising: a processor, a memory, a communication interface and a communication bus, the processor, the memory and the communication interface communicating with one another through the communication bus;
wherein the memory is provided for storing at least one executable instruction, and the executable instruction enables the processor to perform operations corresponding to the data processing method of claim 1.

8. A non-transitory computer storage medium stored with computer programs thereon, wherein the computer programs, when executed by a processor, implement the data processing method of claim 1.

9. A computer program product, comprising computer instructions, wherein the computer instructions instruct a computing device to perform operations corresponding to the data processing method of claim 1.

10. A data processing method, applied to a middleware node of a distributed database system, comprising:
receiving a logic DDL instruction for change of data in the distributed database system and converting the logic DDL instruction into a physical DDL instruction; and
issuing the physical DDL instruction to a corresponding shard node to allow the shard node to execute the physical DDL instruction; and after successful execution of the physical DDL instruction, adjusting log data of the shard node aggregated into a global log based on a consistency relation between a shard node mode snapshot generated for the shard node and a global logic mode snapshot obtained, such that the log data of the shard node aggregated into the global log is consistent with the global logic mode snapshot;
wherein the shard node mode snapshot corresponding to a shard node mode that is changed after the shard node has successfully executed the physical DDL instruction, wherein for each shard node, a shard node mode snapshot is generated for the shard node after the shard node has successfully executed the physical DDL instruction, and wherein the shard node mode snapshot describes logic structure and features of data stored in the corresponding shard node after the shard node has successfully executed the physical DDL instruction; and the global logic mode snapshot corresponding to a global logic mode that is changed after all shard nodes in the database system have successfully executed the physical DDL instruction, wherein the global logic mode snapshot describes logic structure and features of all data stored in the all shard nodes in the database system.

11. The method of claim 10, wherein the method further comprises:
receiving a DDL marking event generated after the respective shard node has successfully executed the physical DDL instruction for indicating successful execution of the logic DDL instruction, and creating the global logic mode snapshot corresponding to the DDL marking event.

12. The method of claim 11, wherein the DDL marking event in the log data of the respective shard node has information of TSO of the distributed database system, and the DDL marking event of the respective shard node has the same TSO; and
the receiving the DDL marking event generated after the respective shard has successfully executed the physical DDL instruction for indicating successful execution of the logic DDL instruction comprises: merging the DDL marking event corresponding to the respective shard node based on the information of the TSO corresponding to the DDL marking event in the log data of the respective shard node; and generating a logic DDL event in a global log based on a merging result.

13. The method of claim 11, wherein the method further comprises: after the receiving the logic DDL instruction for change of data in the distributed database system,
determining an execution rule for the logic DDL instruction based on a type of the logic DDL instruction.

14. The method of claim 10, wherein the method further comprises: after the receiving the logic DDL instruction for change of data in the distributed database system,
determining an execution rule for the logic DDL instruction based on a type of the logic DDL instruction.

15. The method of claim 14, wherein the determining the execution rule for the logic DDL instruction based on the type of the logic DDL instruction comprises:
if the logic DDL instruction is of a type where new mode is compatible with old mode, determining the execution rule of the logic DDL instruction as: issuing the physical DDL instruction to the shard node; generating the DDL marking event for indicating successful execution of the logic DDL instruction after all shard nodes have successfully executed the physical DDL instruction; and setting the new mode to be externally visible after the DDL marking event.

16. The method of claim 14, wherein the determining the execution rule for the logic DDL instruction based on the type of the logic DDL instruction comprises:

if the logic DDL instruction is of a type where old mode is compatible with new mode, determining the execution rule of the logic DDL instruction as: setting the new mode to be externally visible; then issuing the physical DDL instruction to the shard node; and generating a DDL marking event for indicating successful execution of the logic DDL instruction after all shard nodes have successfully executed the physical DDL instruction.

17. An electronic device, comprising: a processor, a memory, a communication interface and a communication bus, the processor, the memory and the communication interface communicating with one another through the communication bus;
    wherein the memory is provided for storing at least one executable instruction, and the executable instruction enables the processor to perform operations corresponding to the data processing method of claim 10.

18. A non-transitory computer storage medium stored with computer programs thereon, wherein the computer programs, when executed by a processor, implement the data processing method of claim 10.

19. A computer program product, comprising computer instructions, wherein the computer instructions instruct a computing device to perform operations corresponding to the data processing method of claim 10.

20. A distributed database system, comprising a middleware node and a shard node, wherein:
    the middleware node is provided for receiving a logic DDL instruction for change of data in the distributed database system, converting the logic DDL instruction into a physical DDL instruction and issuing the physical DDL instruction to the corresponding shard node; and
    the shard node is provided for executing the physical DDL instruction and generating a shard node mode snapshot for the shard node after successful execution of the physical DDL instruction; it is determined that the shard node mode snapshot is inconsistent with a global logic mode snapshot of the distributed database system, log data of the shard node aggregated into the global log is adjusted to be consistent with the global logic mode snapshot;
  wherein the shard node mode snapshot corresponding to a shard node mode that is changed after the shard node has successfully executed the physical DDL instruction, wherein for each shard node, a shard node mode snapshot is generated for the shard node after the shard node has successfully executed the physical DDL instruction, and wherein the shard node mode snapshot describes logic structure and features of data stored in the corresponding shard node after the shard node has successfully executed the physical DDL instruction; and the global logic mode snapshot corresponding to a global logic mode that is changed after all shard nodes in the database system have successfully executed the physical DDL instruction, wherein the global logic mode snapshot describes logic structure and features of all data stored in the all shard nodes in the database system.

* * * * *